(12) United States Patent
Cooper et al.

(10) Patent No.: US 12,365,524 B2
(45) Date of Patent: Jul. 22, 2025

(54) CABLE BUNDLING SYSTEM

(71) Applicant: ABB Schweiz AG, Baden (CH)

(72) Inventors: Anthony Austin Cooper, Memphis, TN (US); Ronald David White, Germantown, TN (US); Henry Joseph Stefanov, Germantown, TN (US); James Baker, Southaven, MS (US)

(73) Assignee: ABB Schweiz AG, Baden (CH)

( * ) Notice: Subject to any disclaimer, the term of this patent is extended or adjusted under 35 U.S.C. 154(b) by 83 days.

(21) Appl. No.: 17/859,478

(22) Filed: Jul. 7, 2022

(65) Prior Publication Data
US 2024/0010403 A1    Jan. 11, 2024

(51) Int. Cl.
B65D 63/10    (2006.01)
F16L 3/233    (2006.01)

(52) U.S. Cl.
CPC ........ B65D 63/1036 (2013.01); F16L 3/2338 (2013.01); B65D 2563/103 (2013.01)

(58) Field of Classification Search
CPC .......... B65D 63/1036; B65D 2563/103; B65D 63/16; B65D 63/1045; F16L 3/2338; Y10T 24/1498; Y10T 24/153; Y10T 24/14; Y10T 24/141
See application file for complete search history.

(56) References Cited

U.S. PATENT DOCUMENTS

| | | | |
|---|---|---|---|
| 3,102,311 A | 9/1963 | Martin et al. | |
| 3,257,694 A | 6/1966 | Litwin | |
| 3,368,247 A | 2/1968 | Orban | |
| 3,562,870 A * | 2/1971 | Sund | B65D 63/1054 24/16 PB |
| 3,588,961 A | 6/1971 | Farago | |
| 3,660,869 A | 5/1972 | Caveney et al. | |
| 3,735,448 A | 5/1973 | Waddington | |

(Continued)

FOREIGN PATENT DOCUMENTS

| | | |
|---|---|---|
| AU | 469885 B2 | 2/1976 |
| DE | 2342681 A1 | 3/1974 |

(Continued)

OTHER PUBLICATIONS

ABB, Ty-Rap Catalog, Fastening solutions, Easily bundle, secure and manage your cables, 2019, 170 pages.

(Continued)

*Primary Examiner* — Jason W San
*Assistant Examiner* — Rowland Do
(74) *Attorney, Agent, or Firm* — McCarter & English, LLP; Michael M. Gnibus

(57) ABSTRACT

A cable bundling system is disclosed. The cable bundling system includes a base having an opening extending through the base; a barb supported by the base and extending at least partially across the opening; and a strap adapted to be advanced through the opening in a first direction. When the strap is displaced in a second direction opposite the first direction, the barb pierces a medial portion of the strap such that the barb contacts the base. The strap can include a longitudinal groove extending a length of the strap, and the barb has a piercing portion opposite a supported portion. The piercing portion can pierce the medial portion of the strap.

19 Claims, 14 Drawing Sheets

(56) References Cited

U.S. PATENT DOCUMENTS

| | | | | |
|---|---|---|---|---|
| 3,875,618 | A * | 4/1975 | Schuplin | B65D 63/16 24/16 PB |
| 3,906,593 | A | 9/1975 | Caveney et al. | |
| 3,908,233 | A | 9/1975 | Caveney et al. | |
| 3,949,449 | A | 4/1976 | Caveney et al. | |
| 3,965,538 | A | 6/1976 | Caveney et al. | |
| 3,973,293 | A | 8/1976 | Noorily | |
| 3,991,444 | A * | 11/1976 | Bailey | B65D 63/1063 24/16 PB |
| 4,272,047 | A | 6/1981 | Botka | |
| 4,272,870 | A | 6/1981 | McCormick | |
| 4,287,644 | A | 9/1981 | Durand | |
| 4,507,828 | A | 4/1985 | Furutsu | |
| 4,631,782 | A | 12/1986 | Gecs | |
| 4,658,478 | A | 4/1987 | Paradis | |
| 4,680,834 | A | 7/1987 | Andre et al. | |
| 4,688,302 | A | 8/1987 | Caveney et al. | |
| 4,776,067 | A | 10/1988 | Sorensen | |
| 4,866,816 | A | 9/1989 | Caveney | |
| 4,993,669 | A * | 2/1991 | Dyer | B65D 63/16 248/74.3 |
| 5,102,075 | A | 4/1992 | Dyer | |
| 5,146,654 | A | 9/1992 | Caveney et al. | |
| 5,193,251 | A | 3/1993 | Fortsch | |
| 5,224,244 | A | 7/1993 | Ikeda et al. | |
| 5,317,787 | A | 6/1994 | Fortsch | |
| 5,389,330 | A | 2/1995 | Sorensen et al. | |
| 5,440,786 | A | 8/1995 | Sorensen et al. | |
| 5,452,523 | A | 9/1995 | Jansen | |
| 5,513,421 | A * | 5/1996 | Wells | B65D 63/1036 24/30.5 P |
| 5,517,727 | A * | 5/1996 | Bernard | H02G 3/26 24/17 AP |
| 5,621,949 | A * | 4/1997 | Wells | B65D 63/1036 24/17 AP |
| 5,642,554 | A | 7/1997 | Sorensen et al. | |
| 5,664,294 | A | 9/1997 | Sorensen et al. | |
| 5,745,957 | A | 5/1998 | Khokhar et al. | |
| 5,890,265 | A | 4/1999 | Christian et al. | |
| 5,911,367 | A | 6/1999 | McInerney | |
| 5,911,368 | A | 6/1999 | Davignon | |
| 5,924,171 | A | 7/1999 | Sorensen et al. | |
| 6,003,208 | A | 12/1999 | Christian et al. | |
| 6,044,524 | A | 4/2000 | Sorensen et al. | |
| 6,128,809 | A * | 10/2000 | Khokhar | F16L 3/2338 24/168 |
| 6,279,203 | B1 * | 8/2001 | Hundley | F16L 3/137 24/30.5 P |
| 6,347,434 | B1 | 2/2002 | Newman | |
| 6,473,942 | B1 * | 11/2002 | Caveney | B65D 63/1036 24/30.5 P |
| 6,484,367 | B1 * | 11/2002 | Caveney | B65D 63/1036 24/17 AP |
| 6,526,628 | B1 | 3/2003 | Caveney | |
| 6,530,126 | B2 * | 3/2003 | Caveney | B65D 63/1036 24/17 AP |
| 6,532,631 | B2 * | 3/2003 | Rohaly | B65D 63/16 248/74.3 |
| 6,763,553 | B2 | 7/2004 | Hatch | |
| 6,928,701 | B2 * | 8/2005 | Hutter, III | B65D 63/1036 24/16 PB |
| 7,017,237 | B2 | 3/2006 | Magno, Jr. et al. | |
| 7,127,779 | B2 | 10/2006 | Hewes | |
| 7,730,592 | B2 | 6/2010 | Krisel | |
| 7,779,515 | B2 * | 8/2010 | DeMik | B65D 63/1036 24/16 PB |
| 7,819,365 | B2 * | 10/2010 | Elsner | H02G 3/32 248/65 |
| 8,407,863 | B2 | 4/2013 | Cheng | |
| 8,516,660 | B2 * | 8/2013 | Ku | B65D 63/1072 24/16 PB |
| 8,578,565 | B2 | 11/2013 | Hienekamp | |
| 8,590,112 | B2 | 11/2013 | Nelson et al. | |
| 9,061,807 | B2 | 6/2015 | Drane et al. | |
| 9,828,152 | B2 | 11/2017 | Dinh | |
| 10,144,566 | B2 | 12/2018 | O'Regan et al. | |
| 10,480,688 | B2 | 11/2019 | Tschida et al. | |
| 2011/0271492 | A1 * | 11/2011 | Posner | F16L 33/035 24/16 R |
| 2012/0272485 | A1 | 11/2012 | Liang | |
| 2013/0081232 | A1 * | 4/2013 | Magno, Jr. | B29C 45/16 24/16 PB |
| 2018/0135780 | A1 | 5/2018 | Tschida et al. | |
| 2018/0282037 | A1 * | 10/2018 | Zant | B32B 5/08 |

FOREIGN PATENT DOCUMENTS

| | | |
|---|---|---|
| EP | 0035368 A1 | 9/1981 |
| EP | 1561702 A1 | 8/2005 |
| EP | 2646338 B1 | 10/2013 |
| WO | 2012075034 A2 | 7/2012 |
| WO | 2017/123869 A1 | 7/2017 |
| WO | 2020/181325 A1 | 9/2020 |

OTHER PUBLICATIONS

European Search Report for European Patent Application No. 23184214.7, dated Oct. 11, 2023, 14 pages.
U.S. Appl. No. 18/332,425, filed Jun. 9, 2023, Pending.
Canadian Office Action for Application No. 3,205,793, dated Aug. 15, 2024, 4 pages.
European Office Action for Application No. 24176449.7, dated Oct. 8, 2024, 10 pages.
European Office Action for Application No. 23184214.7, dated Oct. 11, 2023, 14 pages.

* cited by examiner

CABLE BUNDLING SYSTEM

BACKGROUND

The field of the disclosure relates generally to cable bundling systems and, more particularly, to cable bundling systems having a barb which pierces a cable strap.

Cable bundling systems are used to collect or combine a plurality of cables that are strung in a ceiling, or other suitable suspension location in a building or factory for example. The bundling or locking system may comprise a strap that is adapted to be wrapped around the cable bundle. The strap has a flexible, unitary body with an opening located along the strap.

In use, the strap is wrapped around the cables and one end of the strap is inserted through the opening, and pulled through the opening in a first direction until the strap is positioned snugly against the collected cables. The strap includes outwardly directed locking members that impede loosening displacement of the strap end in a second direction, and as a result the locking members maintain the strap tightly against the cables.

Known straps are flexible. As a result, over time the weight of the cables causes the locking to members to fail, allowing the strap to loosen or fail, thereby releasing the previously secure bundled cables. Because the cable bundles are frequently maintained in ceilings or other difficult to access building locations, repairing cable bundling systems can prove to be difficult. There is a need for a cable bundling system that maintains the support of the cable bundle over time.

BRIEF DESCRIPTION

In one aspect, a cable bundling system is disclosed. The cable bundling system includes a base having an opening extending through the base; a barb supported by the base and extending at least partially across the opening; and a strap adapted to be advanced through the opening in a first direction. When the strap is displaced in a second direction opposite the first direction, the barb pierces a medial portion of the strap such that the barb contacts the base.

In another aspect, a method of cinching an object is disclosed. The method includes wrapping a strap around the object; advancing an end of the strap through an opening of a base in a first direction, the opening extending through the base; and, displacing the strap in a second direction opposite the first direction such that a barb extending at least partially over the opening pierces through a medial portion of the strap such that the barb contacts the base, the barb supported by the base and extending at least partially over the opening.

In another aspect, a method of manufacturing a cable bundling system is disclosed. The method includes forming a base having an opening extending through the base; and positioning a barb on the base such that the barb is supported by the base, the base extending at least partially over the opening. A strap is adapted to be advanced through the opening in a first direction. When the strap is displaced in a second direction opposite the first direction, the barb pierces through a medial portion of the strap such that the barb contacts the base.

BRIEF DESCRIPTION OF THE DRAWINGS

The reference symbols used in the drawings, and their meanings, are listed in summary form in the list of reference symbols. In principle, identical parts are provided with the same reference symbols in the figures.

DETAILED DESCRIPTION

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

As used herein, the spatial terms "upper," "lower," "top" and "bottom" as used in the present disclosure shall denote a component, or an element of a component, which is upstream or downstream relative to other components and elements of components unless the context clearly dictates otherwise. The term "upper" or "top" shall denote a downstream component or element of a component, and the term "lower" or "bottom" shall denote an upstream component or element of a component. Where a component has a top surface and a bottom surface, the top surface is parallel to the bottom surface. Such relative spatial terms are used only to facilitate description and are not meant to be limiting.

Embodiments of the present disclosure are directed to embodiments of a cable bundling system, a method of cinching an object, and a method of manufacturing of the cable bundling system. The cable bundling system includes a base having an opening extending through the base; a barb supported by the base and extending at least partially across the opening; and a strap adapted to be advanced through the opening in a first direction. When the strap is displaced in a second direction opposite the first direction, the barb pierces a medial portion of the strap such that the barb contacts the base. The strap can include a longitudinal groove extending a length of the strap, and the barb has a piercing portion opposite a supported portion. The piercing portion can pierce the medial portion of the strap.

Figure 1:
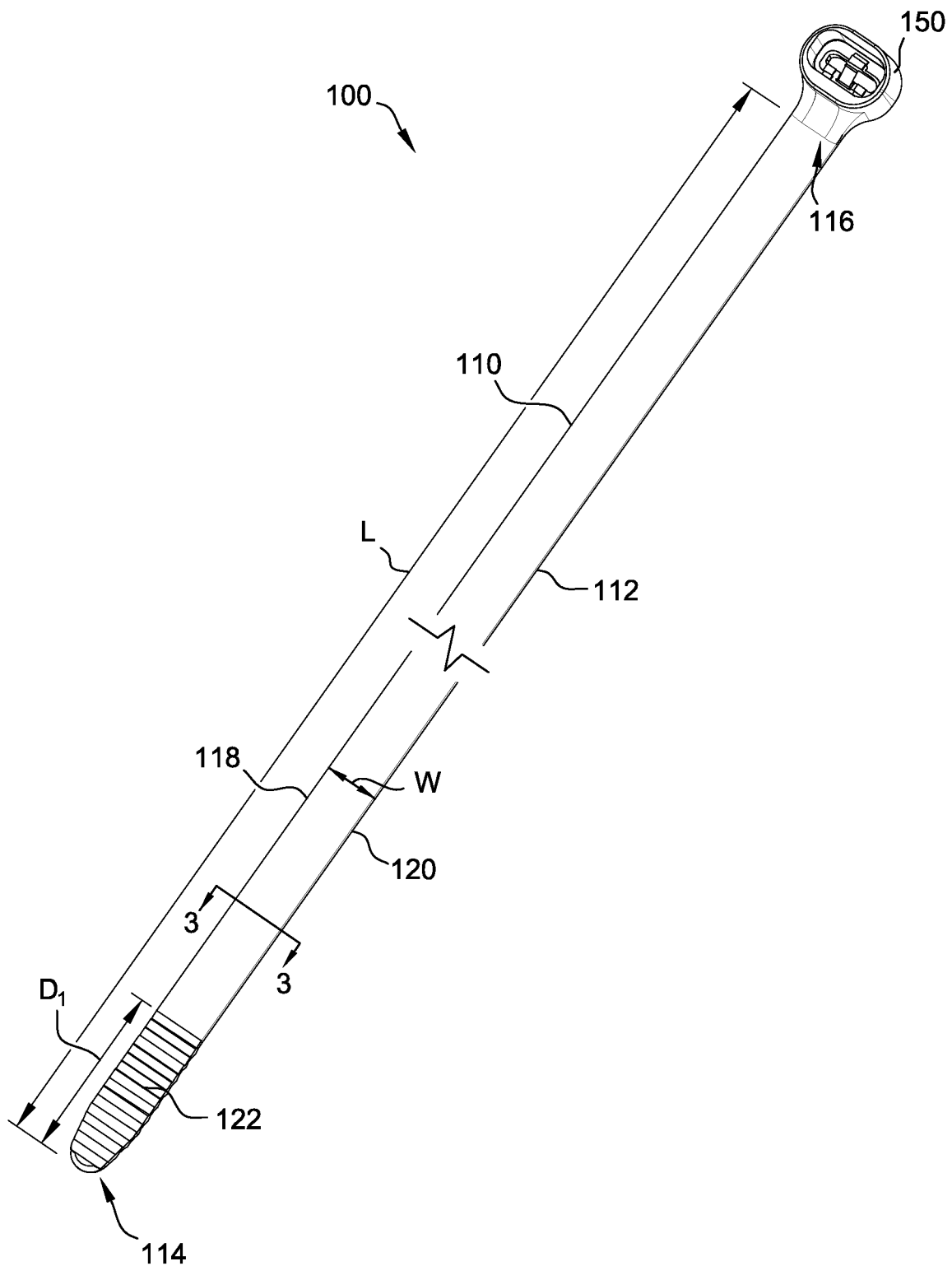
FIG. 1 illustrates a top perspective view of a cable bundling system in accordance with one or more embodiments of the present disclosure.
Figure 2:
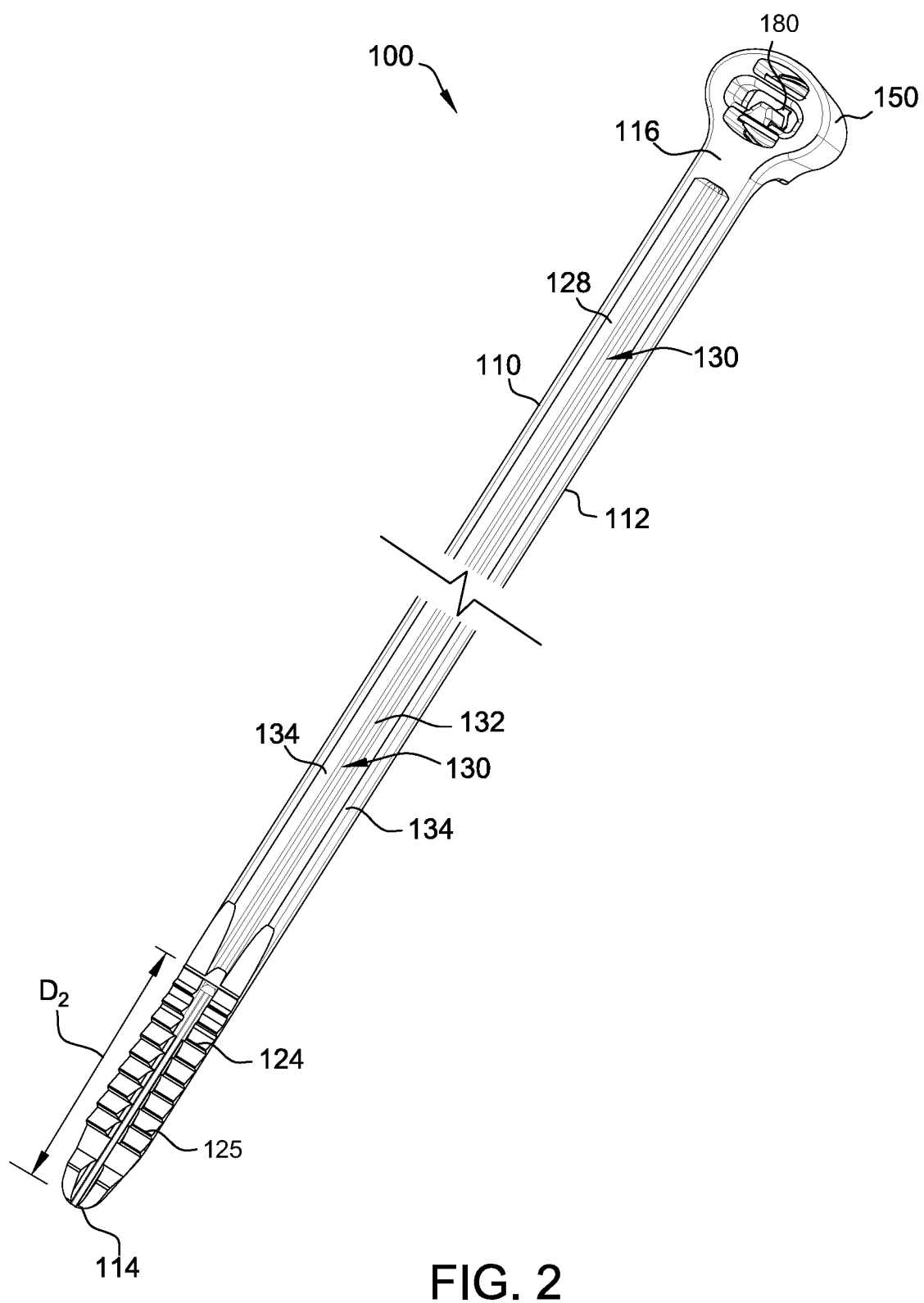
FIG. 2 illustrates a bottom perspective view of the cable bundling system of FIG. 1.

FIG. 1 illustrates a top perspective view of the cable bundling system 100 and FIG. 2 illustrates a bottom perspective view of the cable bundling system 100. As shown, the cable bundling system 100 includes a strap 110 and a base 150. The strap 110 includes an elongate body 112 having a first free end 114, a second end 116 made integral with base 150, and a first lateral edge 118 and a second lateral edge 120 where the edges 118, 120 extend between ends 114 and 116. The distance between first end 114 and second end 116 defines a length L of the strap 110, and the first lateral edge 118 and second lateral edge 120 define a width W of the strap 110. In the illustrated embodiments, the second end 116 of the strap 110 is made integral with the base 150 at the second end 116, thereby forming a unitary body comprising the strap 110 and base 150. In some embodiments, the strap 110 is and base 150 are discrete members. The strap 110 and the base 150 are comprised of a material selected from a group consisting of polymer, nylon, polyamide, heat stabilized nylon, and UV stabilized nylon.

As shown in FIG. 1, in some embodiments, included along a portion of the length of the strap 110 is a ribbed top surface 122. The ribbed top surface 122 extends a distance $D_1$ from the first end 114. The ribbed top surface 122 serves as a surface that enables a user to effectively maintain a grip on the strap as the strap is manipulated and wrapped around the bundle of cables (not shown) to be supported by the system 100. As shown in FIG. 2, in some embodiments, included along a portion of the length of bottom of the strap first end is a barbed bottom surface 124. In some embodiments, the barbed bottom surface 124 extends a distance $D_2$ from the first end 114. The barbed bottom surface is configured to interlock with a barb 180 of the base 150 as the first end 114 is advanced through the base 150 in a first direction, as explained in further detail below and in reference to FIG. 9. The discrete teeth of the barbed bottom surface 124 include floors 125 directed towards the first end 114. The floors 125 interlock with the barb 180 and prevent the strap 110 from advancing in a second direction opposite the first direction as the first end 114 passes through an opening 162 in the base 150. In some embodiments the barbed bottom surface 124 is tapered from the first end 114 to the distance D2, and the tapered barbed bottom surface 124 is configured to align the first end 114 with the opening 162 of the base 150 as the first end 114 passes through the opening 162 of the base 150 to enable the strap 110 to easily be located in and pass through the opening 163.

Figure 3:
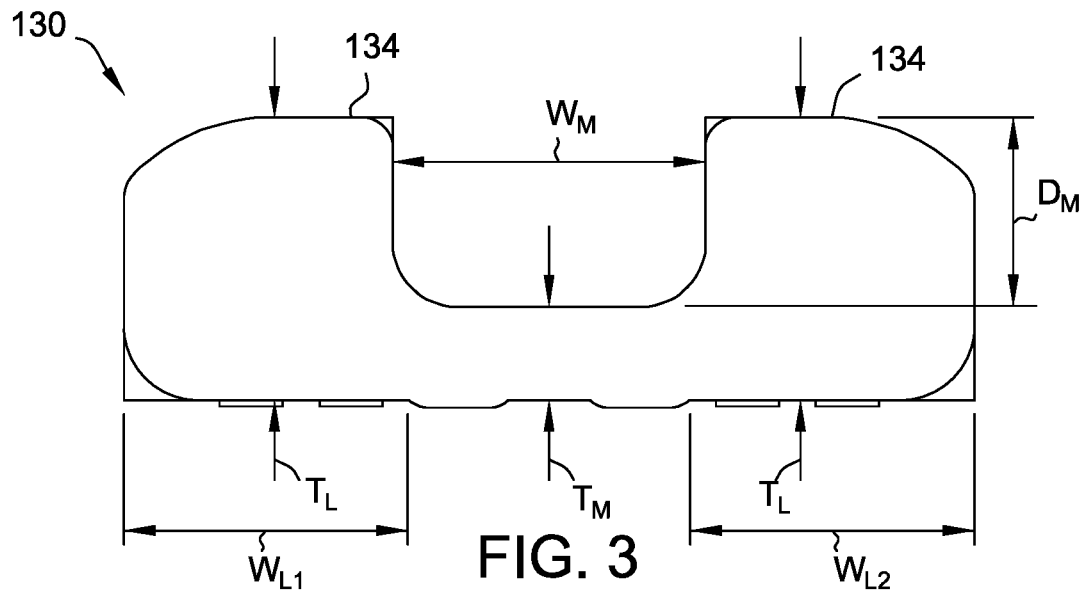
FIG. 3 illustrates a cross-sectional view of a strap of the cable bundling system of FIG. 1, taken along line 3-3 of FIG. 1.

As best shown in FIGS. 2 and 3, in some embodiments, the strap 110 includes a longitudinal groove 130 extending from the second end 116 of the strap 110. In some embodiments, the longitudinal groove 130 extends from the second end 116 to the first end 114 (or the entire length L of the strap 110). In some embodiments, the longitudinal groove 130 extends from the second end 116 to the barbed bottom surface 124 or the ribbed top surface 122. In some embodiments, the longitudinal groove 130 is disposed on the top surface (not shown). In some embodiments, the longitudinal groove 130 is disposed on the bottom surface 128. As best shown in FIG. 3, the cross-section of the longitudinal groove 130 includes a medial portion 132 and lateral portions 134 on either side of the medial portion 132. The medial portion 132 has a thickness $T_M$ that is less than thickness $T_L$ of each of the lateral portions 134. In some embodiments, a ratio of the thickness $T_M$ of the medial portion to the thickness $T_L$ of the lateral portions is in the range of 1:1 to 1:4. Likewise, the medial portion 132 has a width $W_M$ that has a value that is less than the combined widths ($W_{L1}$, $W_{L2}$) of the lateral portions 134. In some embodiments, a ratio of a width $W_M$ of the medial portion to the combined widths ($W_{L1}$, $W_{L2}$) of the lateral portions 134 is in the range of 1:2 to 1:4. In some embodiments, the cross-section of the longitudinal groove 130 has one of a rectangular shape, semi-circular shape, trapezoidal shape, or trigonal shape.

Figure 4:
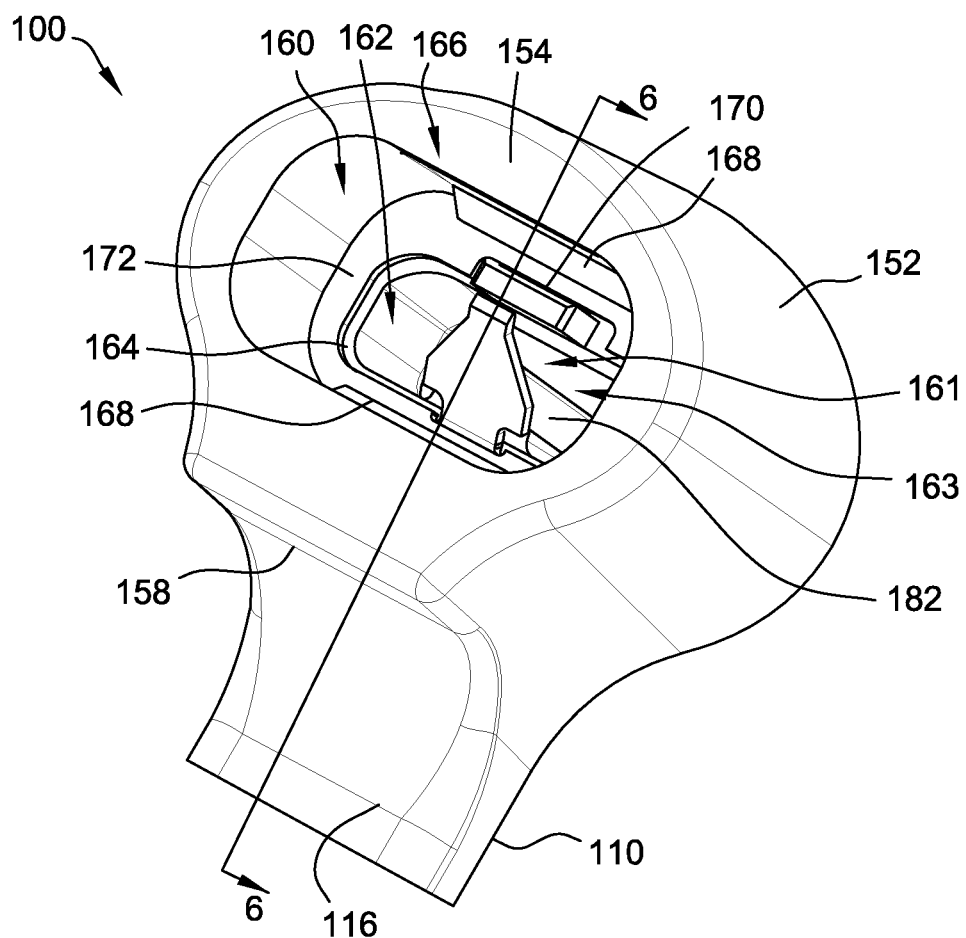
FIG. 4 illustrates a perspective view of a base of the cable bundling system of FIG. 1.
Figure 5:
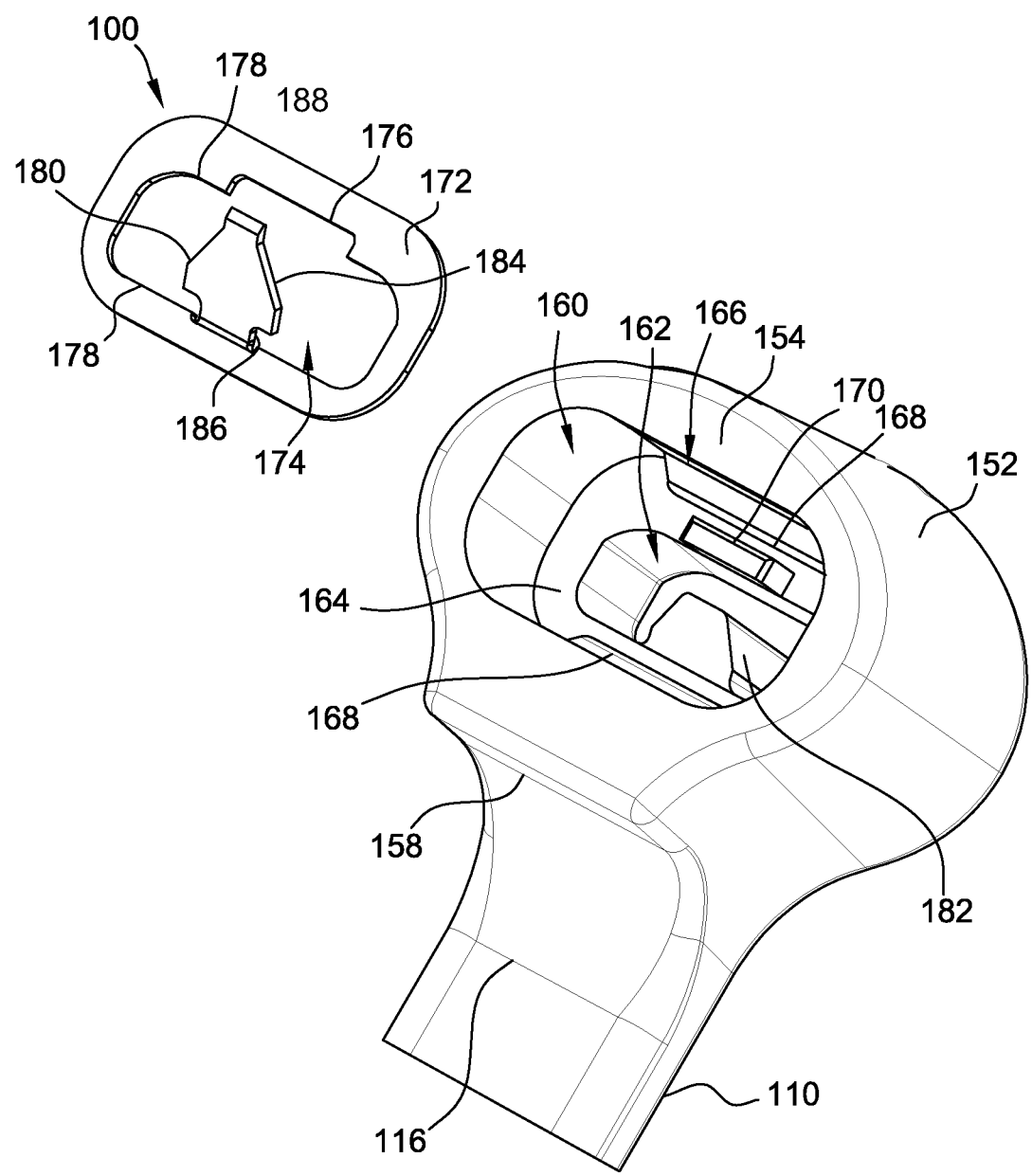
FIG. 5 illustrates an exploded view of the base of FIG. 4.
Figure 6:
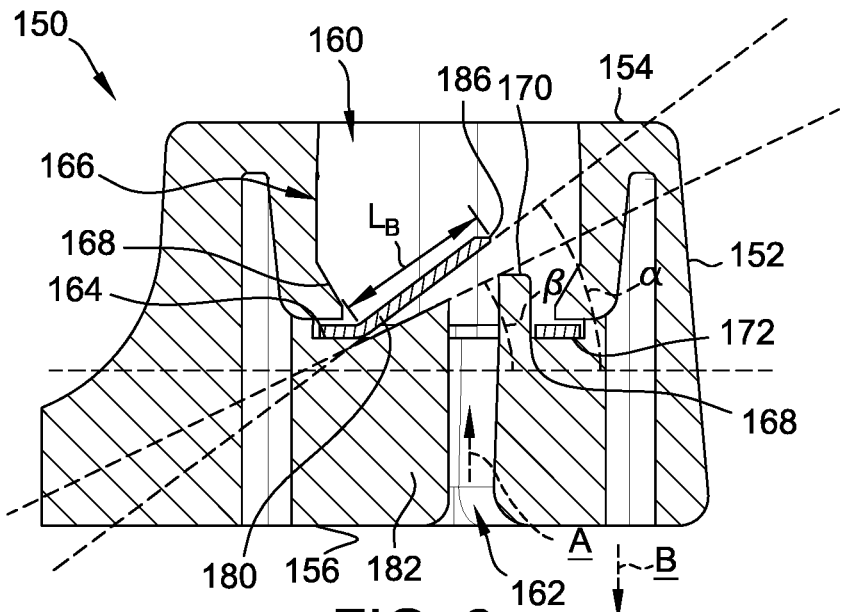
FIG. 6 illustrates a cross-sectional view of the base of FIG. 4, taken along line 6-6 of FIG. 4.
Figure 7:
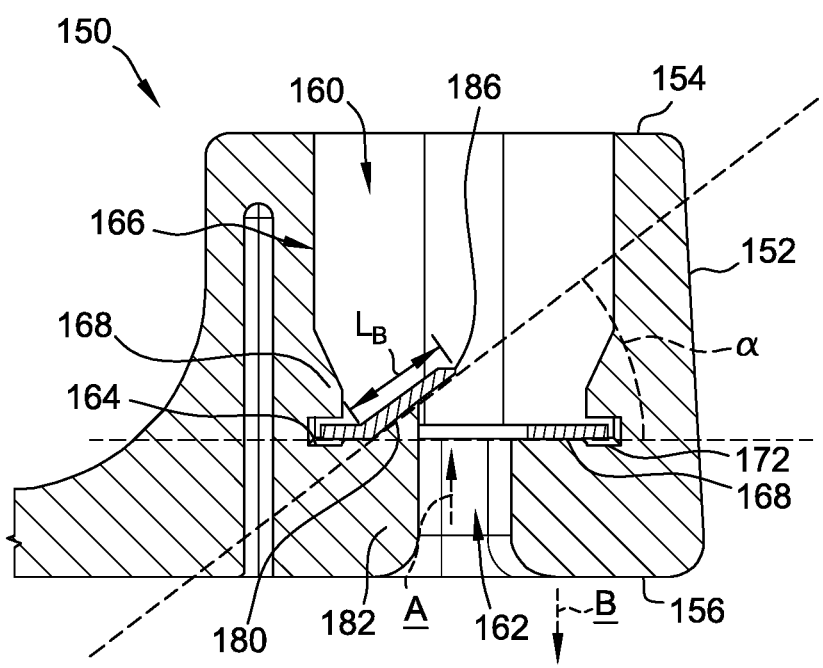
FIG. 7 illustrates a cross-sectional view of the base of FIG. 4 in accordance with one or more embodiments of the present disclosure.
Figure 8:
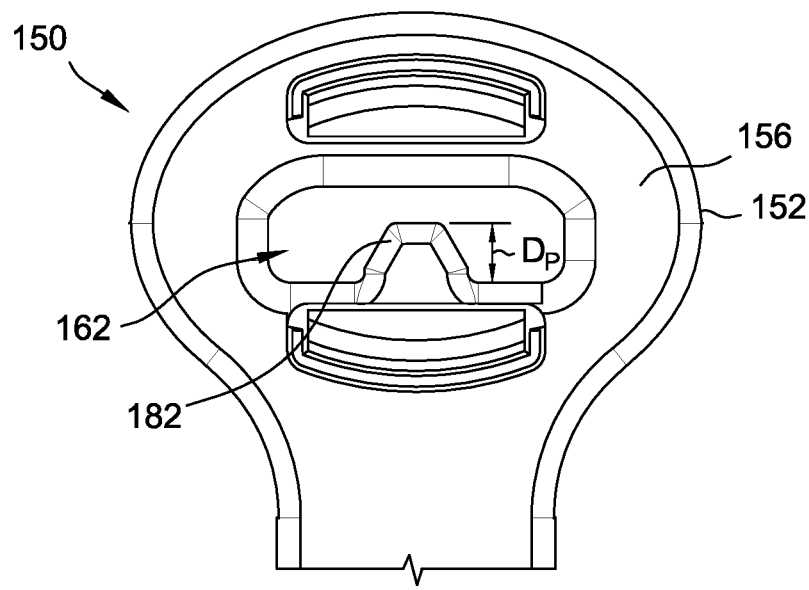
FIG. 8 illustrates a bottom view of the base of FIG. 4.

FIGS. 4 and 5 respectively illustrate an assembled view and an exploded view of the base 150 in accordance with one or more embodiments of the present disclosure. FIGS. 6 and 7 illustrate cross-sectional views of the base 150, and FIG. 8 illustrates a bottom view of the base 150. As shown in the figures, the base 150 includes a body 152 having a top surface 154, a bottom surface 156 and an outer surface 158. The outer surface 158 in some embodiments is integral or unitary to the second end 116 of the strap 110.

A cavity 161 is provided in the base 150. The cavity 161 has an upper aperture 160 provided along the top surface 154 and wall 166. The cavity extends partially through the body 152 of base 150 terminating at a floor 164. Opening 162 is formed along the floor 164 and forms a passageway 159 that extends through body 158 and terminates at lower aperture 163 formed along bottom surface 156. The aperture 160 is concentric with the opening 162, and the aperture 160 has a larger perimeter than the perimeter of the opening 162. Turning to FIGS. 6 and 7, in some embodiments, the inner cavity surface 166 includes interlocking teeth 168. In some embodiments, the floor 164 includes a protrusion 170 extending from the floor 164 and towards the top surface 154 of the base 150.

The base 150 further includes a barb base 172 that is removably seated on floor 164 within cavity 161. The barb base 172 is shown in FIG. 5 removed from the cavity and FIG. 4 shows the barb base seated in the cavity on floor 164. When seated on the floor 164, the barb base 172 is held in place by teeth 168 of cavity wall 166. which overhang the barb base 173 when the barb base 173 is seated on the floor 164. See FIGS. 6 and 7. The barb base 172 can be made of sheet metal, spring metal, stainless steel or brass. In the illustrated embodiments of FIGS. 4 through 7, the barb base 172 has an oval shape similar to the configuration of chamber 161 and wall 166 to enable the barb base 173 to be located in cavity 161 and seated on floor 164. In use, the barb base 172 abuts the floor 164 and is inserted below the interlocking teeth 168, thereby creating a snap-fit. Body 172 is sufficiently flexible to insert a portion of the body below the teeth 168. The barb base 172 has an opening 174 equal to or greater than the opening 162 of the base 150. The opening 174 defines an inner edge 178 of the barb base 172. In some embodiments, the barb base 172 further includes a notch 176 on the inner edge 178 the configured to align and interdigitate with the protrusion 170 of the base 150. To attach the barb base 172 to the base 150, the barb base 172 can be moved toward the floor 164 within the aperture 160 of the base 150 until the barb base 172 is advanced past the interlocking teeth 168 and the barb base 172 creates a snap-fit with the interlocking teeth 168.

As best shown in FIGS. 5 and 6, the barb base 172 further includes a barb 180 extending from the barb base 172 at an angle α relative to the barb base 172. The barb 180 extends from the inner edge 178 of the barb base 172, and the barb 180 extends at least partially across the opening 174. The barb 180 has a piercing portion 184 opposite a supported portion 186, and the supported portion 186 is supported by the base 150. In some embodiments, the piercing portion 184 has a shape having one of a rectangular shape, semicircular shape, trapezoidal shape (as shown in FIG. 5), or trigonal. In some embodiments, the shape of the longitudinal groove 130 (of FIG. 3) is the same as the shape of the piercing portion 184 of the barb 180. In some embodiments, a distal edge 188 of the piercing portion 184 is pointed or chamfered such that the piercing portion 184 can penetrate the medial portion 132 of the longitudinal groove 130 (of FIG. 3). The barb has a length $L_B$ defined by the distance between the supported portion 186 to the distal edge 188 of the piercing portion 184.

As best shown in FIGS. 6 and 7, when the barb base 172 is seated on the base 150, the barb base 173 is supported by the floor 164, and when seated on the floor the barb member 180 extends at least partially across the opening 162 of the base 150 and concentric opening 174 of barb base 172. In some embodiments, the floor 164 further includes a support protrusion 182 adjacent to the opening 162 at an angle β. In some embodiments, (as shown in FIG. 6), the angle β of the support protrusion 182 is less than the angle α of the barb 180. In some embodiments, (as shown in FIG. 7), the angle β of the support protrusion 182 is equal to the angle α of the barb 180.

Figure 10:
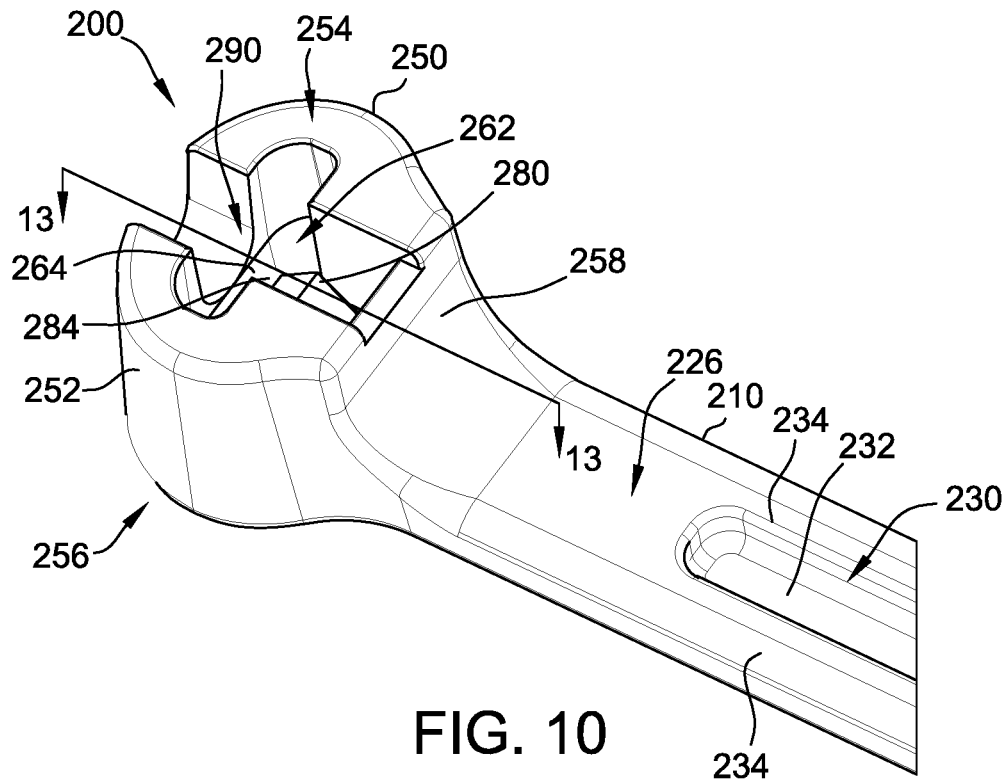
FIG. 10 illustrates a top perspective view of a cable bundling system in accordance with one or more embodiments of the present disclosure.
Figure 11:
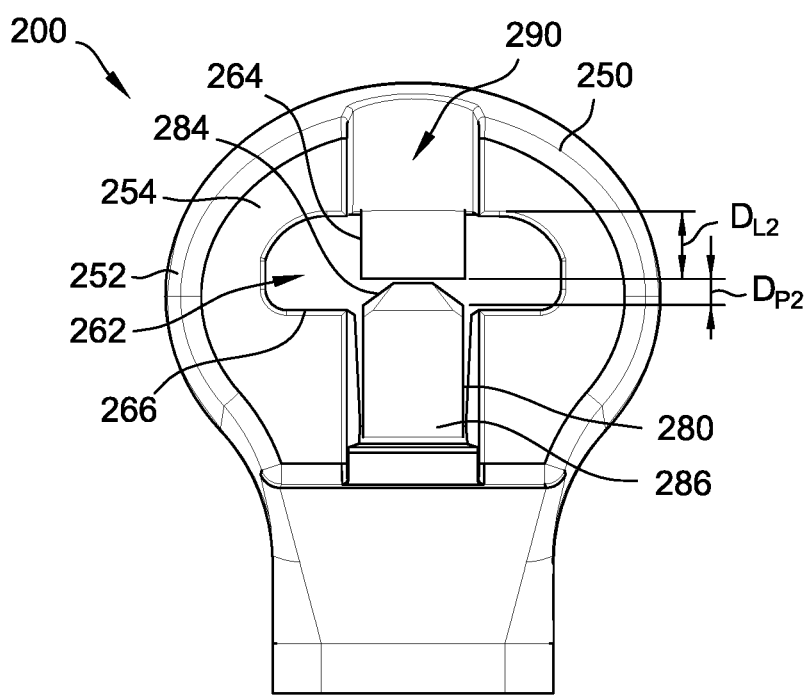
FIG. 11 illustrates a top view of a base of the cable bundling system of FIG. 10.
Figure 12:
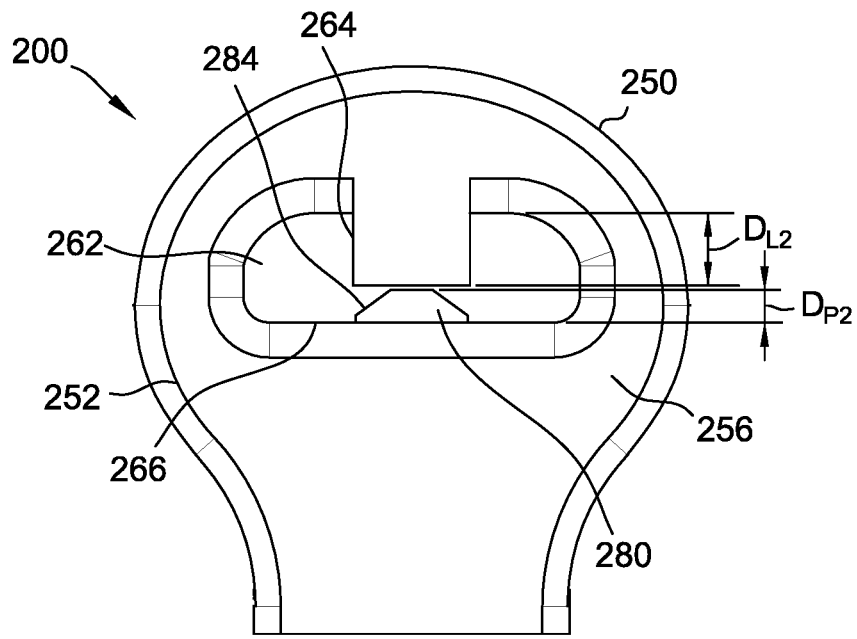
FIG. 12 illustrates a bottom view of a base of the cable bundling system of FIG. 10.

As explained in further detail below with reference to FIG. 10, the support protrusion 182 allows for adjustments to advancing the strap 110 prior to the barb 180 piercing the strap 110. As shown in the bottom view of the base 150 of FIG. 8, the support protrusion 182 can also extend a distance $D_P$ into the opening 162 of the base 150. The distance $D_P$ support protrusion 182 is less than a depth of the longitudinal groove 130 such that the support protrusion 182 is configured to rest in and guide the center the strap 110 as the strap 110 is advanced through the opening 162 of the base 150. In some embodiments, the support protrusion 182 limits the barb 180 from bending over backwards.

Figure 9:
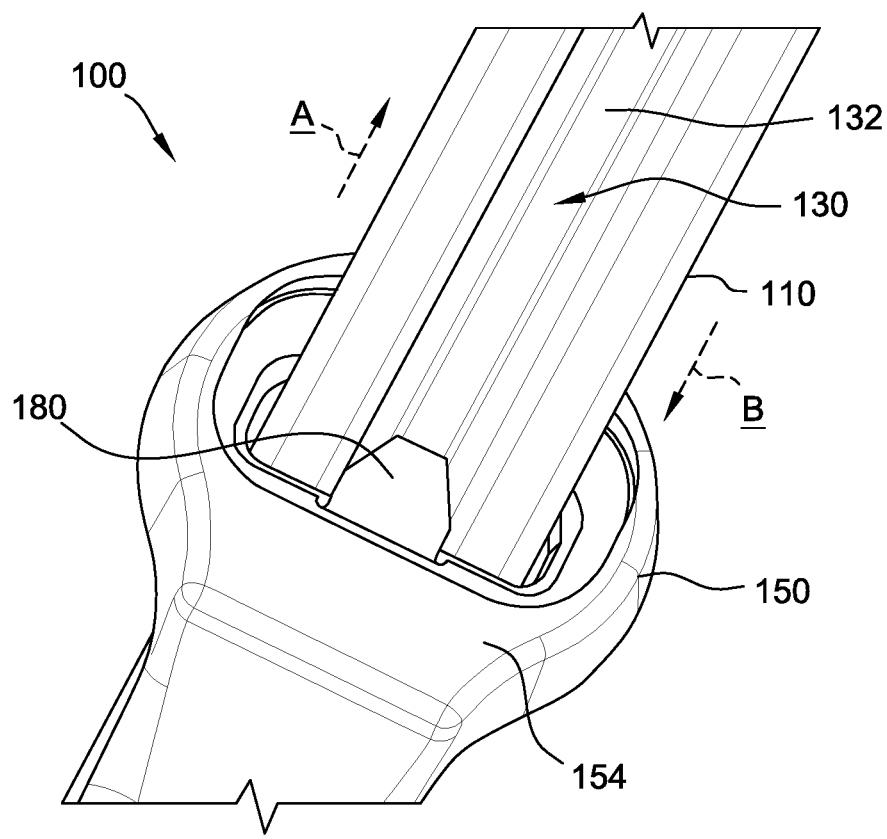
FIG. 9 illustrates a perspective view of a strap inserted through a base of the cable bundling system of FIG. 1.

With reference to FIGS. 6, 7 and 9, the strap 110 is adapted to be advanced through the opening 162 of the base 150 in a first direction (indicated by dashed-arrow A). As the strap 110 advances, the longitudinal groove 130 slides against the barb 180. When the strap 110 is moved through opening 162 in the first direction A, the barb 180 does not engage or penetrate the strap 110. In embodiments where the longitudinal groove 130 is disposed on the bottom surface 128 of the strap 110, the strap 110 is advanced through the opening 162 in the bottom surface 156, through cavity 161 and out through top surface aperture 160.

The strap 110 is advanced in the first direction A until an object surrounded by the strap 110 is cinched to a desired torque or holding force, or until the strap can no longer be advanced in direction A. Subsequently advancing the strap 110 in a second direction (indicated by dashed-arrow B) opposite the first direction A causes the barb 180 to pierce and penetrate and pass through at least the medial portion 132 of the longitudinal groove 130. The barb 180 then deflects or deforms in the second direction B until the barb 180 abuts or contacts the protrusion 170 of the base 150, or the floor 164, or the barb base 172, preventing the strap 110 from further advancing in the second direction B, and non-removably locking the strap 110 to the base 150 and defining a locked state where loosening displacement of the strap 110 is impeded. When in the locked state, he angle α of the barb 180 is less than angle α of the barb 180 in an open state where the strap 110 is not advanced in the second direction B. In some embodiments, the length $L_B$ of the barb 180 is sized to abut or contact the protrusion 170 of the base 150 in the locked state. In some embodiments, the length $L_B$ of the barb 180 is sized to abut or contact the floor 164 or the barb base 172 in the locked state. In some embodiments, at least the distal edge 188 of the barb 180 pierces the longitudinal groove 130. In some embodiments, at least the piercing portion 184 of the barb 180 pierces the longitudinal groove 130.

FIGS. 10-13 illustrate a cable bundling system 200 in accordance with another embodiment of the present disclosure. The cable bundling system 200 of FIGS. 10-13 operates substantially the same as the cable bundling system 100 of FIGS. 1-9. The cable bundling system 200 includes a strap 210 having a longitudinal groove 230 disposed on a top surface 226 of the strap 210. The longitudinal groove 230 includes a medial portion 232 and lateral portions 234 similar to the longitudinal groove 130 of the cable bundling system 100.

A base 250 of the cable bundling system 200 includes a body 252 having a top surface 254, a bottom surface 256 and an outer surface 258. The outer surface 258 in some embodiments is integral or unitary to the strap 210. The base 250 in some embodiments is non-unitary with the strap 210. An opening 262 extends from the top surface 254 of the base 250 through the body 252 and to the bottom surface 256 of the base 250. In some embodiments, a channel 290 disposed on the top surface 254 of the base 250 extends perpendicular or across the opening 262. The channel 290 is aligned with the longitudinal length of strap 210. The channel 290 extends a distance $D_C$ from the top surface 254 of the base 250, defining a floor 264 of the base 250. A barb 180 extends from an inner surface 266 of the base 250 defined by the opening 262 at an angle α relative to the bottom surface 256 of the base 250 in an open state. The barb 180 includes a supported portion 286 at least partially embedded within the inner surface 266 of the base 250 and the piercing portion 284 of the barb 280 extends a distance $D_{P2}$ into the opening 262 of the base 250. In some embodiments, the floor 264 extends a distance $D_{L2}$ into the opening 262 of the base 250. In some embodiments, the distance $D_{L2}$ of the floor 264 is equal to or less than a depth $D_M$ (as shown in FIG. 3) of the medial portion 232 of the longitudinal groove 230.

Figure 13:
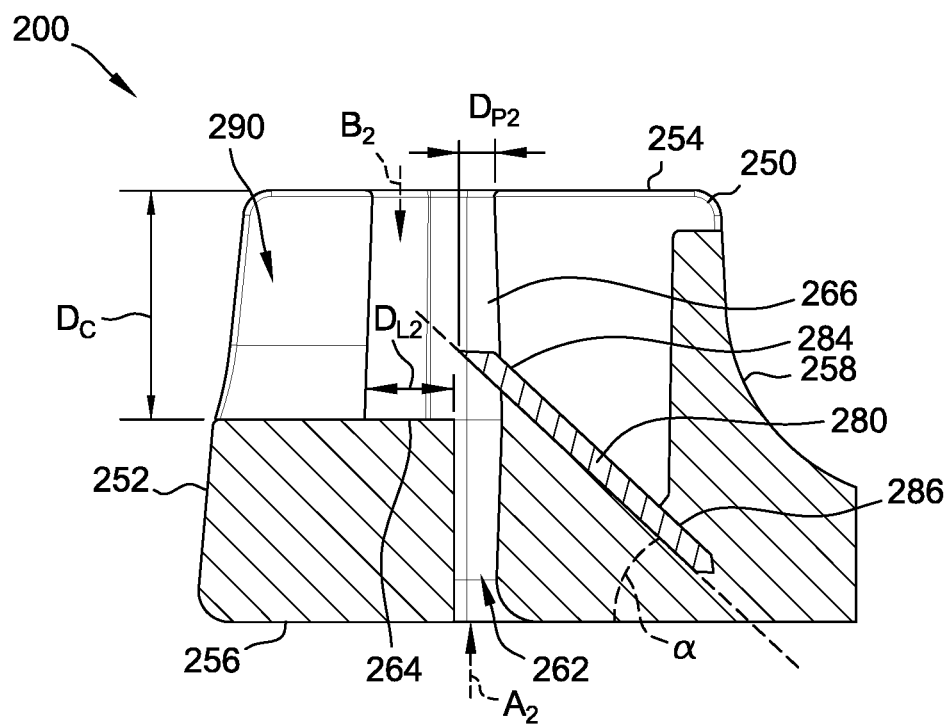
FIG. 13 illustrates a cross-sectional view of a base of the cable bundling system of FIG. 10, taken along line 13-13 of FIG. 10.

As best shown in FIG. 13, the strap 210 can be advanced in a first direction (indicated by dashed-arrow $A_2$) such that the medial portion 232 interdigitates with the floor 264 until an object surrounded by the strap 210 is cinched to a desired torque or holding force. Subsequently advancing the strap 210 in a second direction (indicated by dashed-arrow $B_2$), opposite the first direction A causes the barb 180 to pierce through at least the medial portion 132 of the longitudinal groove 130 from a bottom surface 228 (as shown in FIG. 10) of the strap 210. In some embodiments, the barb 280 then deflects or deforms in the second direction $B_2$ until the barb 280 abuts or contacts the floor 264 of the base 250, preventing the strap 210 from further advancing in the second direction $B_2$, and non-removably locking the strap 210 to the base 250 defining a locked state. Stated differently, the angle α of the barb 280 in the locked state is less than angle α of the barb 280 in an open state where the strap 210 is not advanced int he second direction $B_2$.

Figure 14:
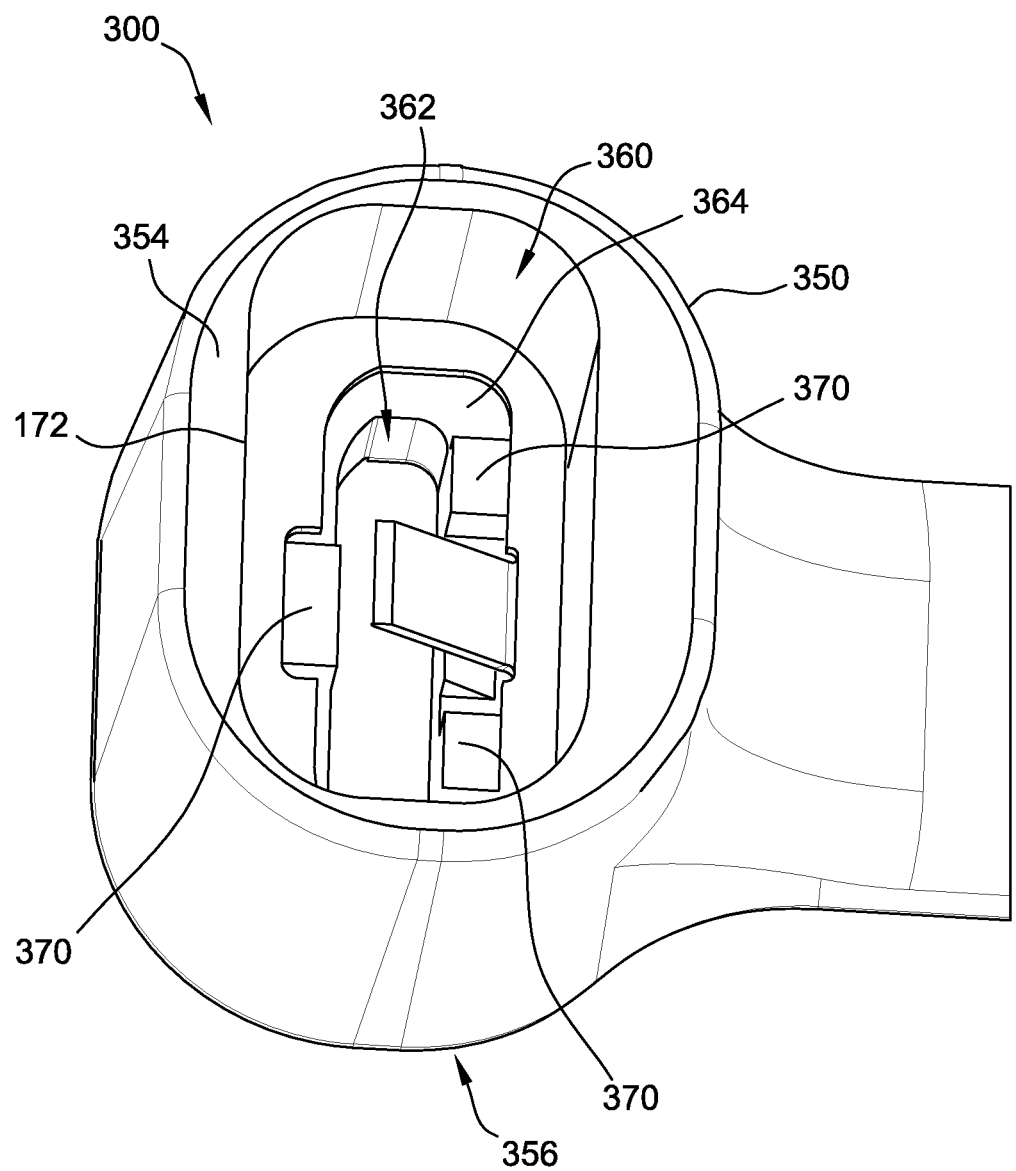
FIG. 14 illustrates a perspective view of a cable bundling system in accordance with one or more embodiments of the present disclosure.
Figure 15:
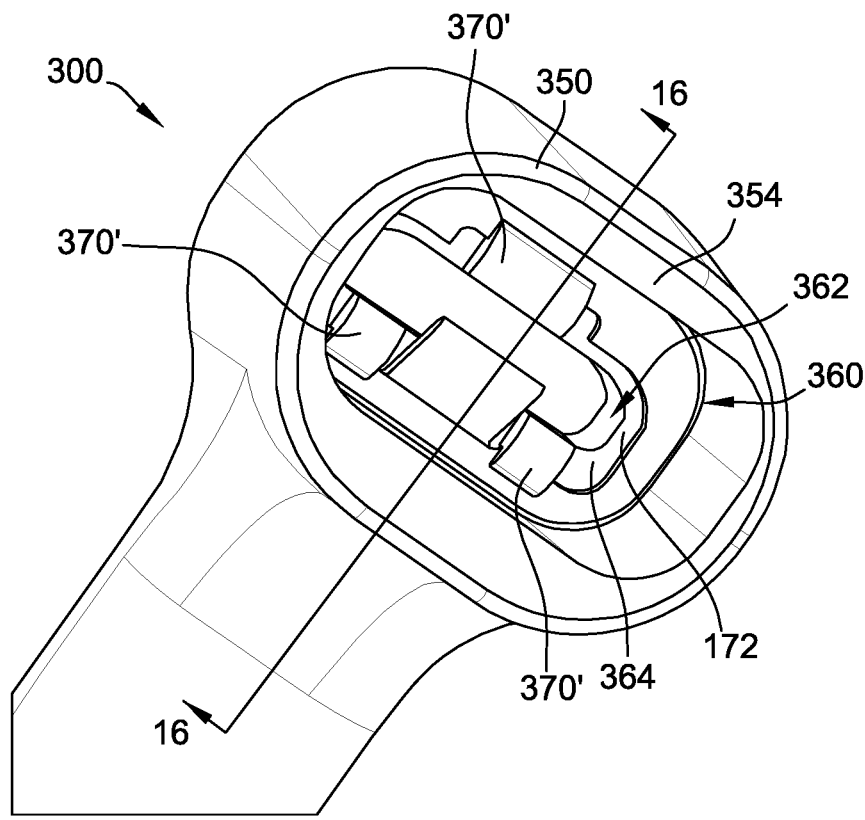
FIG. 15 illustrates a perspective view of the cable bundling system of FIG. 14.
Figure 16:
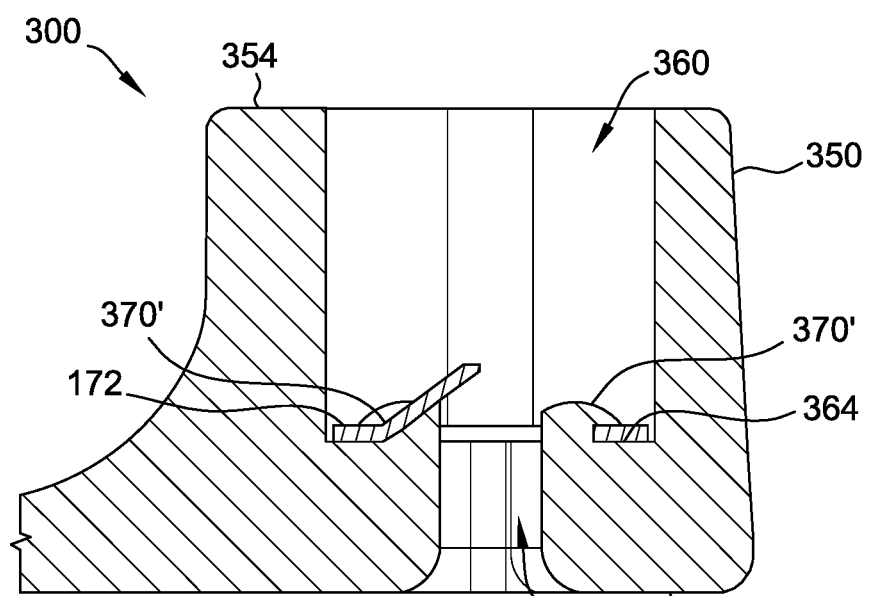
FIG. 16 illustrates a cross-sectional view of the cable bundling system of FIG. 15, taken along line 16-16 of FIG. 15.

FIGS. 14-16 illustrate a cable bundling system 300 having a base 350 in accordance with another embodiment of the present disclosure. The cable bundling system 300 of FIGS. 14-16 operates substantially the same as the cable bundling system 100 of FIGS. 1-9 and cable bundling system 200 of FIGS. 10-13.

An aperture 360 extends a distance from a top surface 354 of the base 350 and an opening 362 extends from the top surface 354 of the base 350 through the body 352 and to a bottom surface 356 of the base 350. The aperture 360 is concentric with the opening 362, and the aperture 360 has a larger surface area than a surface area of the opening 362, defining a floor 364 of the base 350. Stated differently, the floor 364 is positioned a distance from the top surface 354 of the base 350. In some embodiments, the floor 364 includes two or more protrusions 370 extending from the floor 364 and towards the top surface 354 of the base 350. To secure the barb base 172 as described in FIG. 5 to the base 350, the barb base 172 can be positioned against the floor 364 as shown in FIG. 14, and the two or more protrusions 370 can be heat-staked such that the barb base 172 is secured to the base 350. As shown in FIGS. 15 and 16, the resulting heat-staked protrusions 370' at least partially cover the barb base 172.

Figure 17:
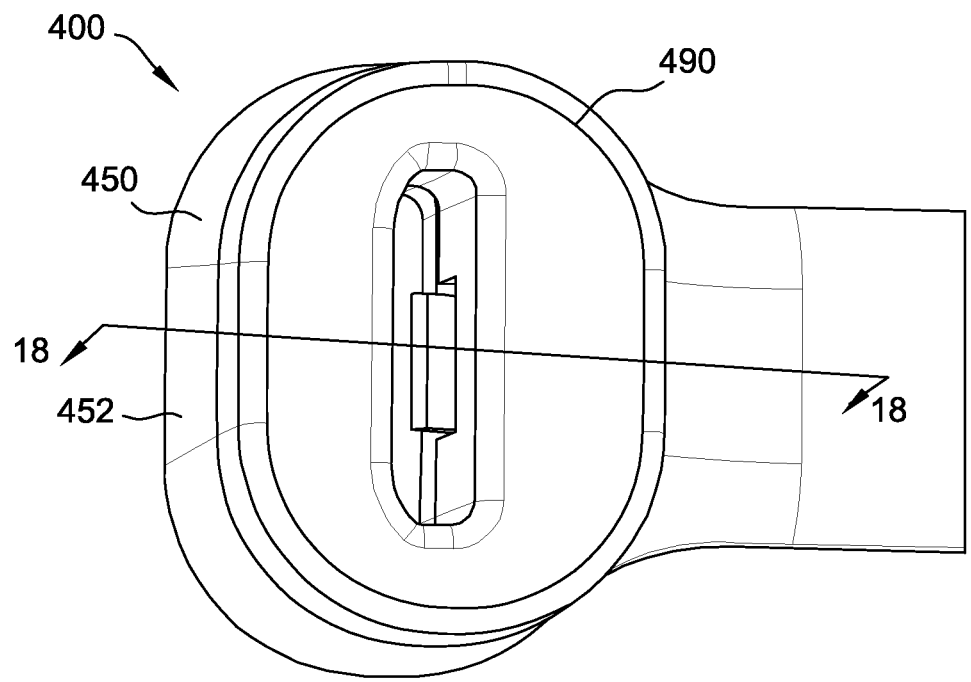
FIG. 17 illustrates a perspective view of a cable bundling system in accordance with one or more embodiments of the present disclosure.
Figure 18:
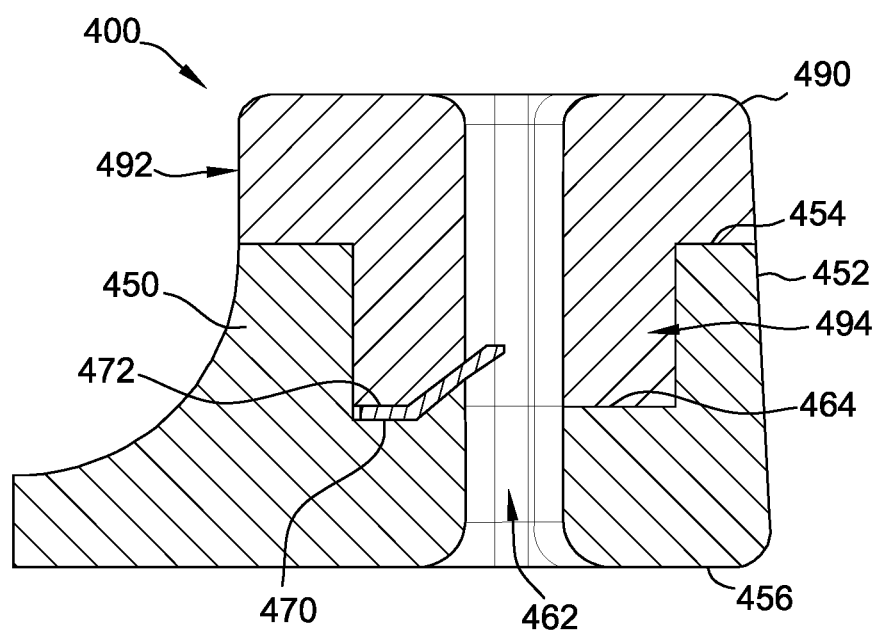
FIG. 18 illustrates a cross-sectional view of the cable bundling system of FIG. 17, taken along line 18-18 of FIG. 17.
Figure 19:
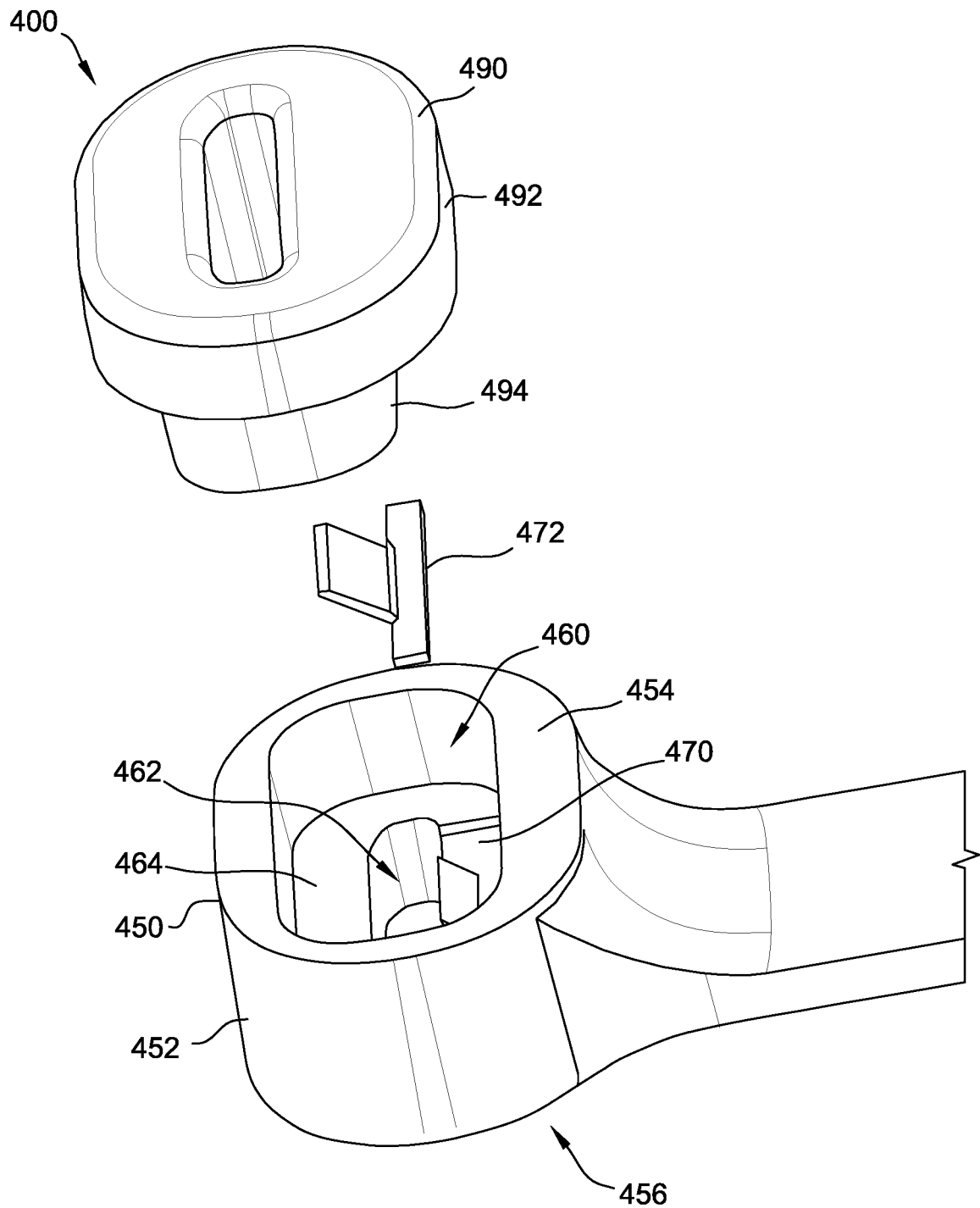
FIG. 19 illustrates an exploded view of the cable bundling system of FIG. 17.
Figure 20:
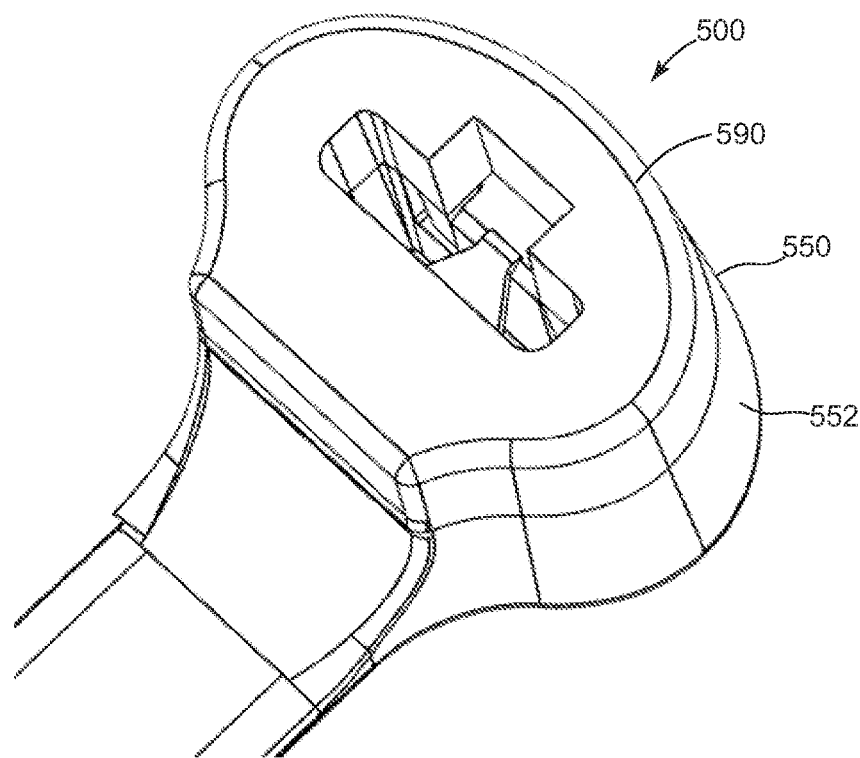
FIG. 20 illustrates a perspective view of a cable bundling system in accordance with one or more embodiments of the present disclosure.
Figure 21:
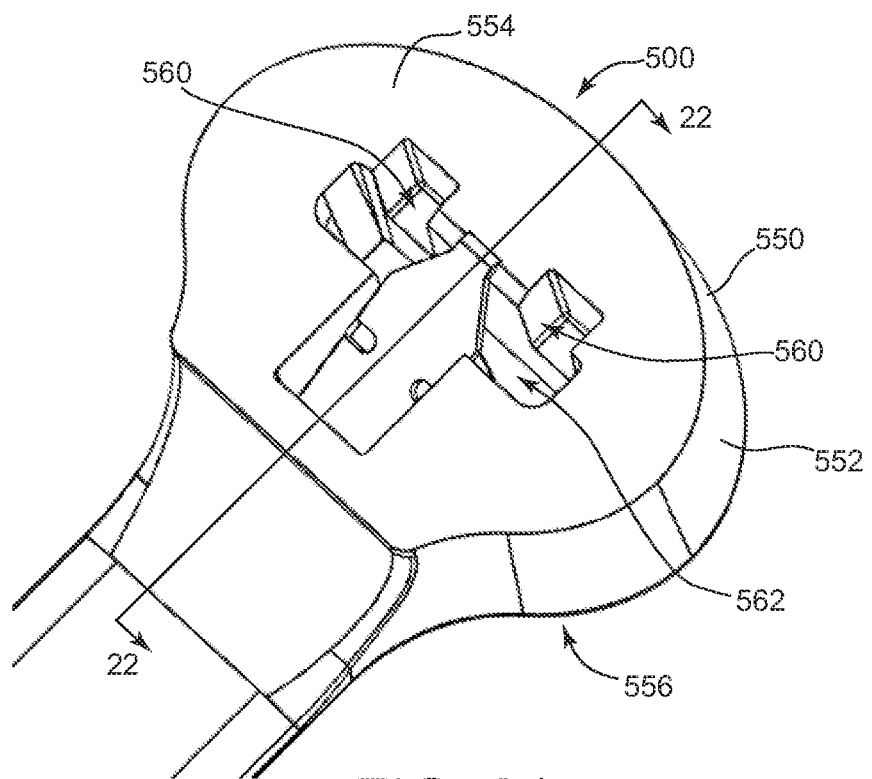
FIG. 21 illustrates a perspective view of a base of the cable bundling system of FIG. 20.
Figure 22:
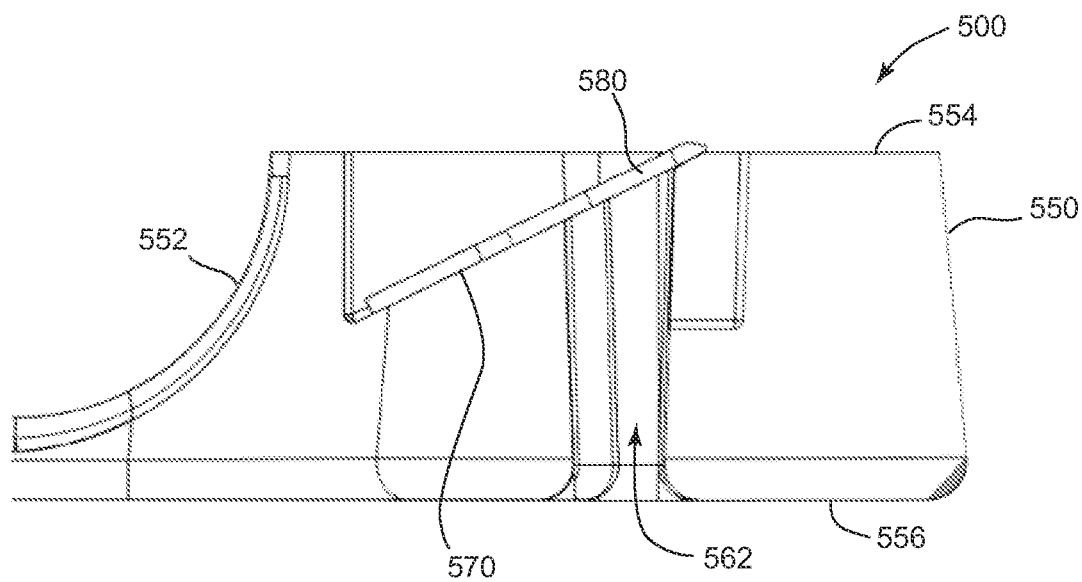
FIG. 22 illustrates a cross-sectional view of the base of FIG. 21, taken along line 22-22 of FIG. 21; and, FIG. 23 illustrates a perspective view of a cap of the cable bundling system of FIG. 21.
Figure 23:
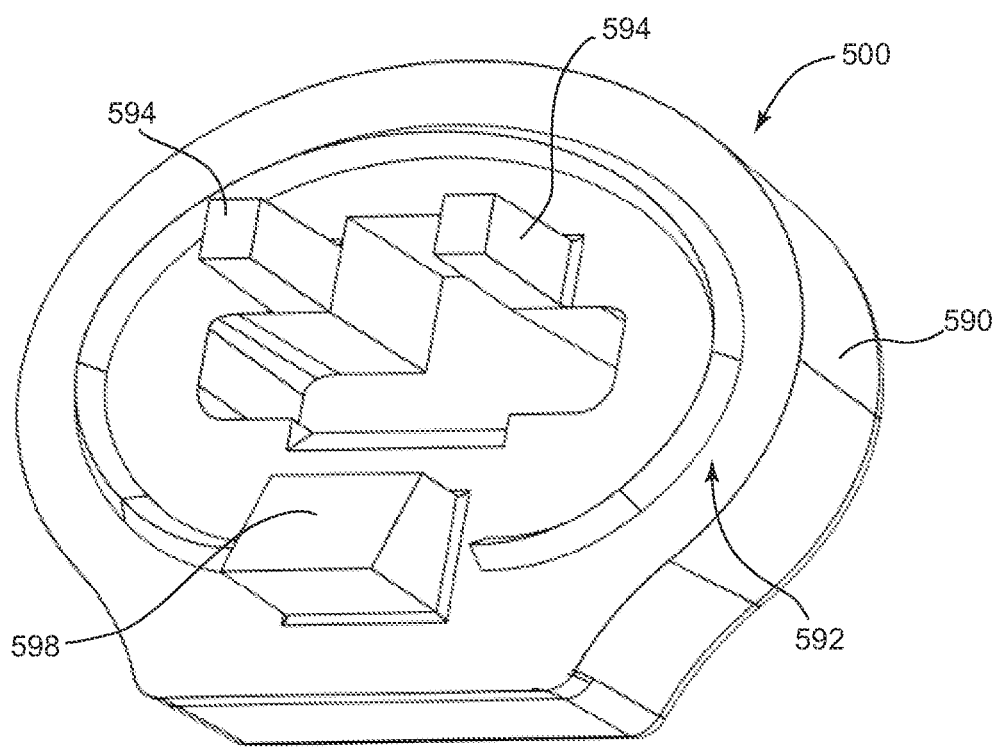

FIGS. 17-19 illustrate a cable bundling system 400 having a base 450 in accordance with another embodiment of the present disclosure. The cable bundling system 400 of FIGS. 17-19 operates substantially the same as the cable bundling system 100 of FIGS. 1-9.

The base 450 includes a base body 452 and a cap 490. An aperture 460 extends a distance from a top surface 454 of the base 450 and an opening 462 extends from the top surface 454 of the base 450 through the body 352 and to a bottom surface 456 of the base 450. The aperture 460 is concentric with the opening 462, and the aperture 460 has a larger surface area than a surface area of the opening 462, defining a floor 464 of the base 450. Stated differently, the floor 464 is positioned a distance from the top surface 454 of the base 450. In some embodiments, the floor 464 includes a slot 470 for receiving a barb base 472. The cap 490 includes a top portion 492 and a bottom portion 494, the top portion 492 having a larger cross-section than a cross-section of the bottom portion 494. As best shown in FIG. 18, the bottom portion 494 is sized and configured to fit within the aperture 460, securing the barb base 472 to the base 450. The bottom portion 494 is secured to the base body 452 by a press fit, an interference fit, or by an adhesive. In some embodiments, the bottom portion 494 is sonic welded to the base body 452.

FIGS. 20-23 illustrate a cable bundling system 500 having a base 550 in accordance with another embodiment of the present disclosure. The cable bundling system 500 of FIGS. 20-23 operates substantially the same as the cable bundling systems as previously disclosed.

The base 550 includes a base body 552 and a cap 590. The base body 552 has a top surface 554 including an opening 562 extending to a bottom surface 556. The top surface 554 further includes at least two apertures 560 extending a distance into the top base body 552. The at least two apertures 560 are configured to interdigitate with at least two prongs 594 disposed on a bottom surface 592 of the cap 590. In some embodiments, the base body 552 further includes a sloped surface 570 configured to receive a barb 580. Likewise, in some embodiments, the bottom surface 592 of the cap 590 includes a sloped protrusion 598 configured to secure the barb 580 to the base body 552 upon insertion of the at least two prongs 594 into the at least two apertures 560 of the base body 552. The at least two apertures 560 of the base body 552 are secured to the least two prongs 594 by a press fit, an interference fit, or by an adhesive. In some embodiments, the cap 590 is sonic welded to the base body 452.

A method of cinching an object using the cable bundling systems described herein includes wrapping a strap around the object; advancing an end of the strap through an opening of a base in a first direction, and, displacing the strap in a second direction opposite the first direction such that a barb extending at least partially over the opening pierces through a medial portion of the strap such that the barb contacts the base.

A method of manufacturing a cable bundling system includes forming a base having an opening extending through the base; and, positioning a barb on the base such that the barb is supported by the base, the base extending at least partially over the opening. In some embodiments, the method includes press-fitting the barb 180 to the interlocking teeth 168 of the base 150. As shown in FIGS. 14-15, in some embodiments, the method further includes forming at least one protrusion 370 extending from the base 350, and heat-staking the at least one protrusion 370 to the base 350 such that the heat-staked protrusion 370' secures the barb 380 to the base 350. As shown in FIGS. 20 through 23, in some embodiments, the method further includes forming at least two apertures 560 on the top surface 554 of the base 550 and and interdigitating at least two prongs 594 of the cap 590, and securing the cap 590 to the base 550 by a press-fit, sonic welding, adhesive, sintering or interference fit.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An object bundling system comprising:
    a base having an opening extending through the base;
    a barb supported by the base and extending at least partially across the opening; and
    a strap adapted to be advanced through the opening in a first direction,
    wherein when the strap is displaced in a second direction opposite the first direction, the barb pierces a medial portion of the strap such that the barb contacts the base,
    wherein a ratio of the thickness of the medial portion to the thickness of the strap is in the range of 1:2 to 1:4, and
    wherein the base includes a cavity extending partially through the base defining a floor and an inner surface, the inner surface including interlocking teeth configured to create a snap-fit with the barb.

2. The object bundling system of claim 1, wherein a cross-section of the strap includes a longitudinal groove extending a length of the strap, the cross-section including the medial portion and lateral portions.

3. The cable bundling system of claim 2, wherein a ratio of a width of the medial portion to a combined width of the lateral portions is in the range of 1:2 to 1:4.

4. The object bundling system of claim 2, wherein the longitudinal groove has one of a rectangular shape, semi-circular shape, trapezoidal shape, or trigonal shape.

5. The object bundling system of claim 4, wherein the barb has a piercing portion opposite a supported portion, the supported portion supported by the base, the piercing portion having a shape having one of a rectangular shape, semi-circular shape, trapezoidal shape, or trigonal.

6. The object bundling system of claim 5, wherein the shape of the cross-section of the longitudinal groove is the same as the shape of the barb.

7. The object bundling system of claim 1, wherein the barb is comprised of a material selected from a group consisting of sheet metal, spring metal and steel; and the strap is comprised of a material selected from a group consisting of polymer, nylon, polyamide, heat stabilized nylon, and UV stabilized nylon.

8. The object bundling system of claim 1, wherein the base includes a cavity extending partially through the base defining a floor and an inner surface, wherein the barb is at least partially embedded within the inner surface.

9. The object bundling system of claim 1, wherein the base includes a cavity extending partially through the base defining a floor, wherein the barb is seated against the floor and a cap is inserted into the cavity thereby securing the barb to the base.

10. The object bundling system of claim 9, wherein the cap further includes at least one protrusion extending from the cap that the heat-staked to the base, wherein the cap is secured to the base by a means consisting of press-fit, sonic welding, adhesive, sintering and interference fit.

11. The object bundling system of claim 1, wherein at least two protrusions extend from the base and are configured to heat-stake the barb to a floor defined by a cavity extending partially into the base.

12. The object bundling system of claim 1, wherein the barb is angled relative to the base in the first direction.

13. The object bundling system of claim 12, wherein the base includes a sloped protrusion extending from the base having substantially the same angle as the barb, wherein the sloped protrusion deforms upon displacement of the strap in the second direction.

14. The object bundling system of claim 1, wherein the barb has a piercing portion opposite a supported portion, the supported portion supported by the base, the piercing portion having one of a rectangular shape, semi-circular shape, trapezoidal shape, or trigonal.

15. A method of cinching an object comprising:
    wrapping a strap around the object;
    advancing an end of the strap through an opening of a base in a first direction, the opening extending through the base; and
    displacing the strap in a second direction opposite the first direction such that a barb extending at least partially over the opening pierces through a medial portion of the strap such that the barb contacts the base, the barb supported by the base and extending at least partially over the opening,
    wherein a ratio of the thickness of the medial portion to the thickness of the strap is in the range of 1:2 to 1:4, and
    wherein the base includes a cavity extending partially through the base defining a floor and an inner surface, the inner surface including interlocking teeth configured to create a snap-fit with the barb.

16. A method of manufacturing an object bundling system comprising:
    forming a base having an opening extending through the base; and
    positioning a barb on the base such that the barb is supported by the base, the base extending at least partially over the opening,
    wherein a strap is adapted to be advanced through the opening in a first direction,
    wherein when the strap is displaced in a second direction opposite the first direction, the barb pierces through a medial portion of the strap such that the barb contacts the base, wherein a ratio of the thickness of the medial portion to the thickness of the strap is in the range of 1:2 to 1:4, and wherein the base includes a cavity extending partially through the base defining a floor and an inner surface, the inner surface including interlocking teeth configured to create a snap-fit with the barb.

17. The method of manufacturing of claim 16 further comprising forming at least one protrusion extending from the base, and heat-staking the at least one protrusion to the base such that the heat-staked protrusion secures the barb to the base.

18. The method of manufacturing of claim 17 further comprising forming interlocking teeth on the base, and press-fitting the barb to the interlocking teeth of the base.

19. The method of manufacturing of claim 18 further comprising forming at least two protrusions extending from the base, and interdigitating a cap positioned above the barb and the base to the base, and securing the cap to the base by a press-fit, sonic welding, adhesive, sintering or interference fit.

* * * * *